Patented Oct. 9, 1928.

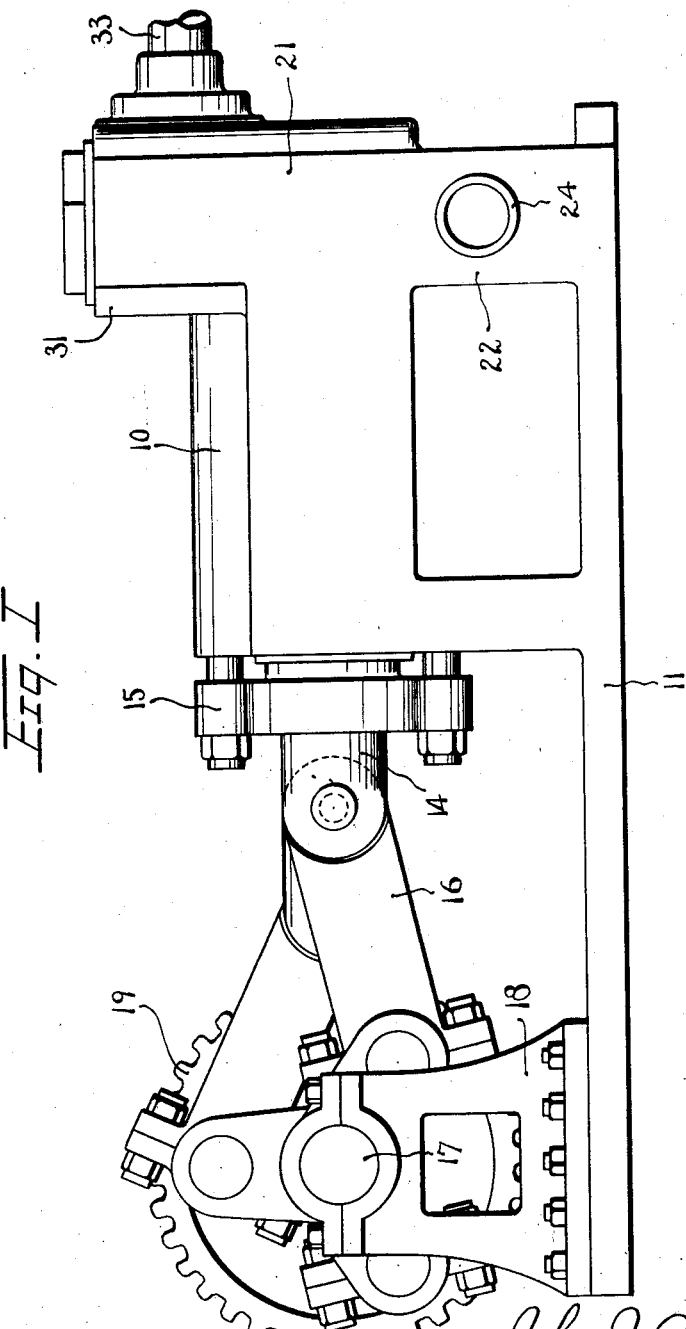

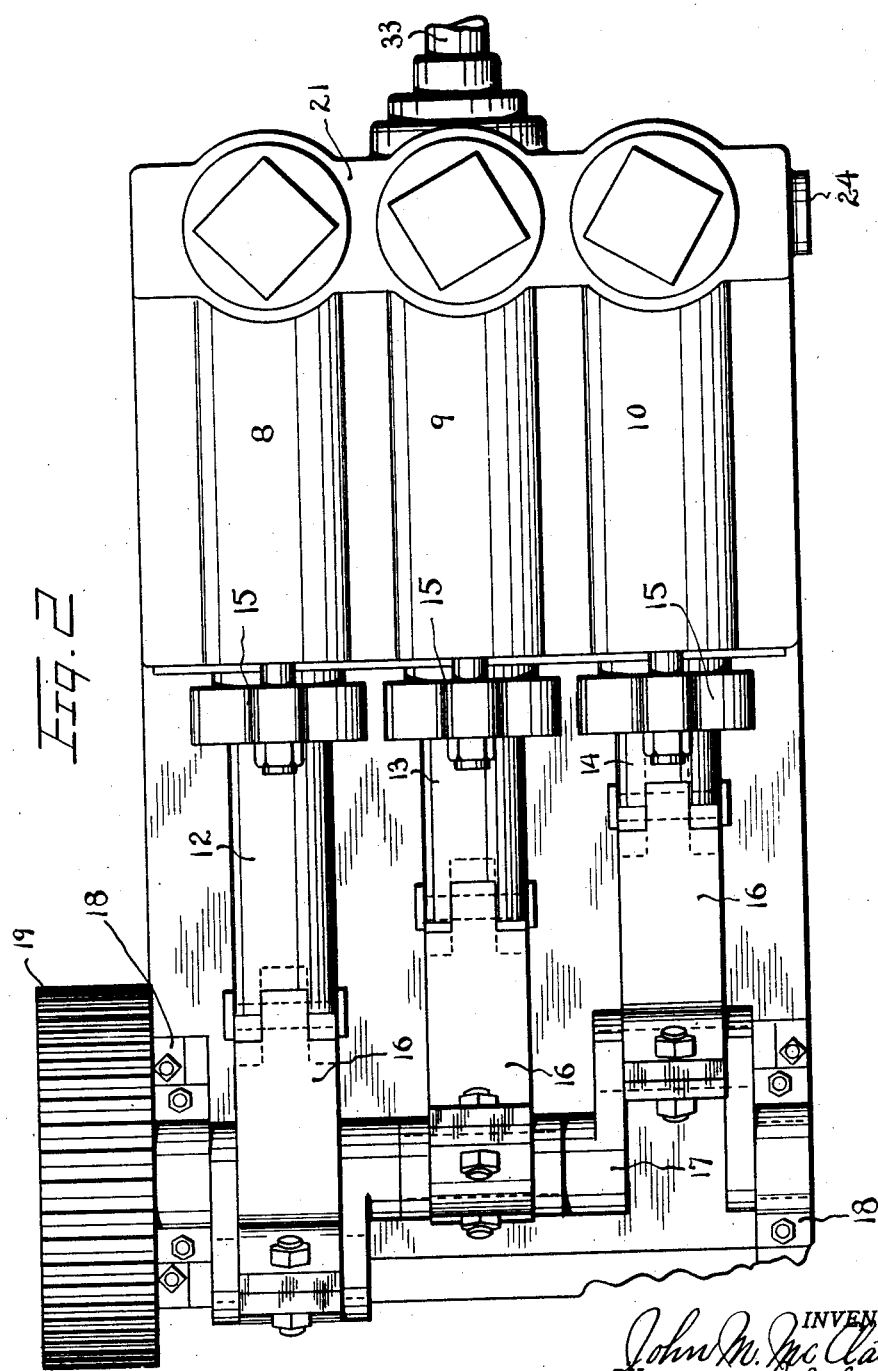

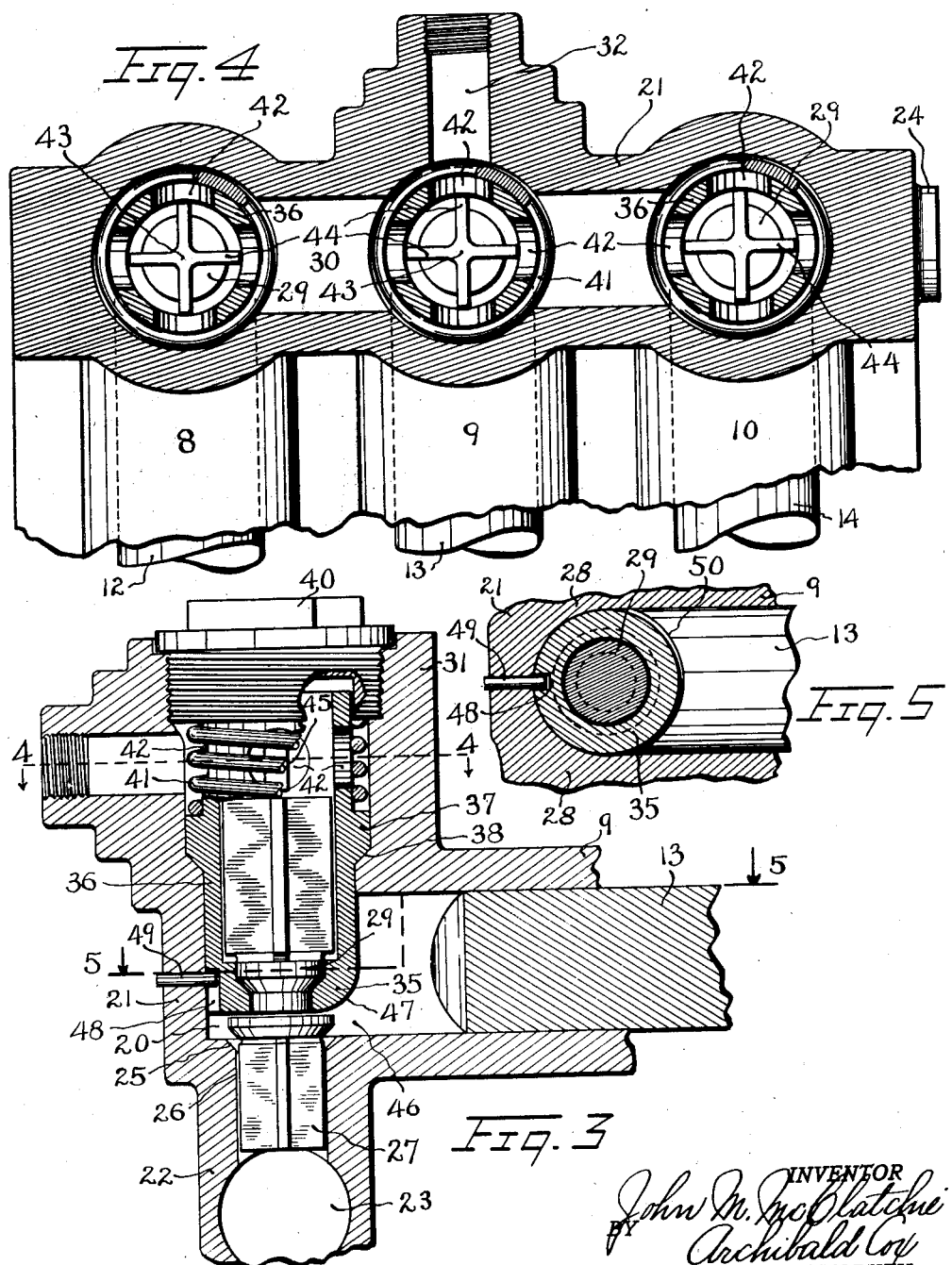

1,687,029

UNITED STATES PATENT OFFICE.

JOHN M. McCLATCHIE, OF NEW YORK, N. Y., ASSIGNOR TO THE BORDEN COMPANY, OF NEW YORK, N. Y., A CORPORATION OF NEW JERSEY.

PUMP.

Application filed December 31, 1926. Serial No. 158,143.

The invention relates to an improvement in pumps.

The object of the invention is to produce a pump suitable for withdrawing evaporated milk from a vacuum pan or other evaporating receptacle and forcing it through a homogenizer. Such a pump must not only be capable of producing a high vacuum in order to withdraw the milk from the vacuum pan and be capable of exerting the pressure sufficient to force the milk through the homogenizer, but it must also be so constructed that it can be readily taken apart for cleaning. So far as I am aware, there is on the market today no pump capable of withdrawing milk from a vacuum pan and forcing it through a homogenizer so constructed that it can be readily taken apart for cleansing purposes. The improved pump is hereinafter fully described and particularly pointed out in the appended claims.

In the accompanying drawings illustrating the preferred form of the invention, Fig. 1 is a side elevation of the improved pump; Fig. 2 is a top plan of the parts shown in Fig. 1; Fig. 3 is a vertical longitudinal section on an enlarged scale through the forward end of one of the cylinders: Fig. 4 is a longitudinal section through the discharge or outlet conduit, taken along substantially the line 4—4 of Fig. 3: and Fig. 5 is a detail section taken along the line 5—5 of Fig. 3.

In order to assure the delivery of a steady stream of milk to and through the homogenizer the improved pump as illustrated in the drawings is of the triplex type, the crank pins on the shaft for driving the pistons being spaced substantially 120° apart. In its general features of construction the pump comprises three cylinders 8, 9 and 10 arranged side by side and supported on the forward end of a base 11. In the cylinders 8, 9 and 10 are respectively mounted the pistons 12, 13 and 14. A tight joint is established between the rear ends of the cylinders and their respective pistons by means of the stuffing boxes or glands 15. The pistons are connected at their rear ends by the connecting rods 16 with the crank shaft 17 journaled at its outer ends in the bearing blocks 18 rising from the rear end of the base 11. Power is applied to the gear 19 mounted on a projecting end of the shaft 17 to drive the pump from any convenient source. The pump parts thus far described are of usual construction and mode of operation.

The forward ends of the cylinders 8, 9 and 10 open into the chambers 20 (Fig 3) which extend transversely across the front end of the casing 21 which is formed integrally with the cylinders. The chambers 20 are separated by the vertical walls 28 which constitute forward extensions of the walls of the cylinders. Formed under the chambers 20 in the downward projection 22 of the casing 21 is an inlet conduit 23 which extends uninterruptedly the full width of the casing 21. The inlet conduit 23 has an opening 24 in one end of the projection 22 and in this opening is screwed one end of the pipe which leads to the vacuum pan. The inlet conduit 23 discharges into the chambers 20 by means of three valves 25, each valve 25 being seated in a vertical port or opening 26 located in line with its respective cylinder. On the out or suction stroke of its respective piston each valve 25 rises into its chamber 20 and the milk flows into the cylinder in which the piston is retreating. Each valve 25 is of usual construction, consisting of an upper disk-like part and a downwardly extending stem provided with the wings or fins 27 by which the valve is guided in its up and down movements in the vertical port 26 and between which the milk passes into the chamber 20 and into the cylinder connected therewith.

Each cylinder discharges through a valve 29 located above the valve 25. The valves 29 admit the milk into a common discharge conduit 30 formed in the upper extension 31 of the casing 21 and extending transversely the width thereof. The conduit 30 has its discharge opening at 32 in the front side of the extension 31. The discharge opening 32 is connected by the pipe 33 with the homogenizer or other point to which the pump delivers the milk.

Each valve 29, which is of the disk type similar to the valves 25, is seated in the lower end 35 of a hollow cylindrical valve casing 36 which fits in a vertically arranged hole in the casing 21 formed in alinement with its respective cylinder and port 26. Each valve casing 36 is provided with an annular shoulder 37 which rests on a corresponding shoulder 38 formed in the casing 21, the two shoulders being ground to make a tight joint. The upper end of the hole in which each valve casing 36 is fitted is closed by a plug 40. The upper end of each valve casing 36 projects upwardly within the plug 40 which thereby acts to center the upper part of the valve casing. Interposed between the upper surface of the annular shoulder 37 on each valve casing and the lower end of the plug 40 is an expansion spring 41, the coils of which are separated to permit the passage of milk therebetween. The milk discharged through the valves 29 passes upwardly through the hollow valve casings 36 and is discharged therefrom through the radial holes 42 formed in the upper end of the casings in alinement with the discharge conduit 30 and outlet opening 32. The holes 42 are located substantially opposite the springs 41, but inasmuch as the coils of the springs are spaced apart they do not appreciably impede the passage of the milk. The valves 29 are provided with the upwardly extending stems 43 having the lateral wings or fins 44 between which the milk passes and which serve to guide the valves 29 in their vertical movements in the valve casings 36. The stop pins 45 extending downwardly from the centers of the plugs 40 limit the upward movement of the valves 29.

The lower part of each cylindrical valve casing 36 extends downwardly into the chamber 20 forming the extension of each cylinder, as will be seen by referring to Fig. 3, the lower extremity of the valve casing 36 being separated from the top surface of the valve 25 (when the latter is in closed position) by a relatively narrow space. This space is just sufficient to permit the valve 25 to unseat far enough (as shown) to allow the flow of milk from the inlet conduit 23 into the chamber 20 and the cylinder. In order to provide a throat at the point 46 where the chamber joins the cylinder large enough to permit the milk to flow freely into the cylinder, the rear bottom edge of the lower end 35 of the valve casing 36 is chamfered or rounded off, as indicated at 47. To assist the workman in properly positioning the valve casings 36 so as to locate the chamfered or rounded portions 47 thereof opposite the ends of the pistons, each valve casing 36 is provided with a vertical slot 48 which passes over a pin 49 entering the front side of the casing 21 and projecting into the chamber 20.

The forward end of each piston is grooved vertically, the groove 50 being an arc of substantially the same radius as the cylindrical lower part of each valve casing 36. As a result of this construction the forward end of each piston closely embraces the downwardly projecting part of each valve casing at the end of each compression stroke. With this arrangement of parts there is left at the end of each compression stroke only a relatively small space, namely, that existing between the two valves.

The mode of operation of the improved pump is substantially the same as in other pumps of this character. On the intake stroke of each piston the vacuum created in the cylinder and in the chamber 20 at the end of the cylinder causes the valve 29 to be seated and the valve 25 to lift, thereby permitting the milk in the inlet conduit 23 to flow past the valve 25, through the chamber 20 and into the cylinder. On the return or compression stroke of the piston the valve 25 is forced into its seat and the valve 29 is unseated, permitting the milk to pass through the valve casing 36, up into the discharge conduit 30 and out through the outlet 32. By reason of the fact that the head of each piston is concave to enable it to come into close proximity with the adjacent side of the valve casing 36 at the end of the compression stroke, and by reason of the fact that there is only a relatively small space between the lower end of the valve casing and the bottom of the chamber 20, a relatively great vacuum can be secured, sufficient to withdraw the milk from a vacuum pan. The space between the lower end of the valve casing 36 and the bottom of each chamber 30 being occupied by milk at the end of each compression stroke and this space being relatively small, the retreat of the forward end of the piston on the suction stroke creates a relatively high vacuum in the cylinder. To these features of construction is added the novel arrangement of the valves enabling the workman to disassemble the valves for cleaning and assemble them again with the expenditure of a minimum of time and energy. In disassembling the valves it is simply necessary to unscrew the nut or plug 40, lift out the valve casing 36 which takes with it the spring 41 and valve 29, and if necessary lift out the valve 25. These parts and the pump itself may then be cleaned in the usual manner. The valves are then reassembled, first by dropping the valve 25 in place, then inserting the valve casing 36 with the valve 29 therein and the spring 41 in place thereon, the valve casing 36 being manipulated so that the slot 48 will pass over the pin 49 so as to present the round bottom edge 47 to the piston, and then the plug 40 is screwed into place. The pump is now in condition for operation again.

Having thus described the invention what I claim as new is:—

1. A pump comprising, a cylinder, a piston mounted to reciprocate in the cylinder, means for actuating the piston, a chamber communicating with the forward end of the cylinder, an inlet valve in the bottom of the chamber, a cylindrical valve casing extending downwardly into the chamber, an outlet valve seated in the casing, the forward end of the piston being provided with a vertical groove the arc of which is formed on substantially the same radius as that of the valve casing.

2. A pump comprising, a horizontally arranged cylinder, a piston mounted to reciprocate in the cylinder, means for actuating the piston, a casing connected with the forward end of the cylinder and having a chamber into which the cylinder opens, a vertically acting inlet valve in the bottom of the chamber, a vertically arranged cylindrical valve casing located in the casing above the inlet valve with its lower end projecting downwardly into the chamber, a vertically acting outlet valve in the valve casing, means for yieldingly holding the valve casing in place, the forward end of the piston being provided with a vertical groove, the arc of which is formed on substantially the same radius as that of the part of the valve casing projecting into the chamber.

3. A pump comprising, a horizontally arranged cylinder, a piston mounted to reciprocate in the cylinder, means for actuating the piston, a casing connected with the cylinder and having therein a chamber communicating with the forward end of the cylinder, a vertically acting inlet valve located in the bottom of the chamber, a removable cylindrical valve casing extending downwardly into the chamber, an inlet valve seated in the casing, the forward end of the piston being provided with a vertical groove, the arc of which is formed on substantially the same radius as the part of the valve casing extending into the chamber and the bottom edge of the valve casing facing the end of the piston being chamfered, and cooperating means on the casing and the valve casing for presenting the chamfered edge of the valve casing to the end of the piston.

JOHN M. McCLATCHIE.